Feb. 2, 1937. P. LORTON 2,069,584
FURNACE FOR THE INCINERATION OF HOUSEHOLD REFUSE
Filed Jan. 26, 1933
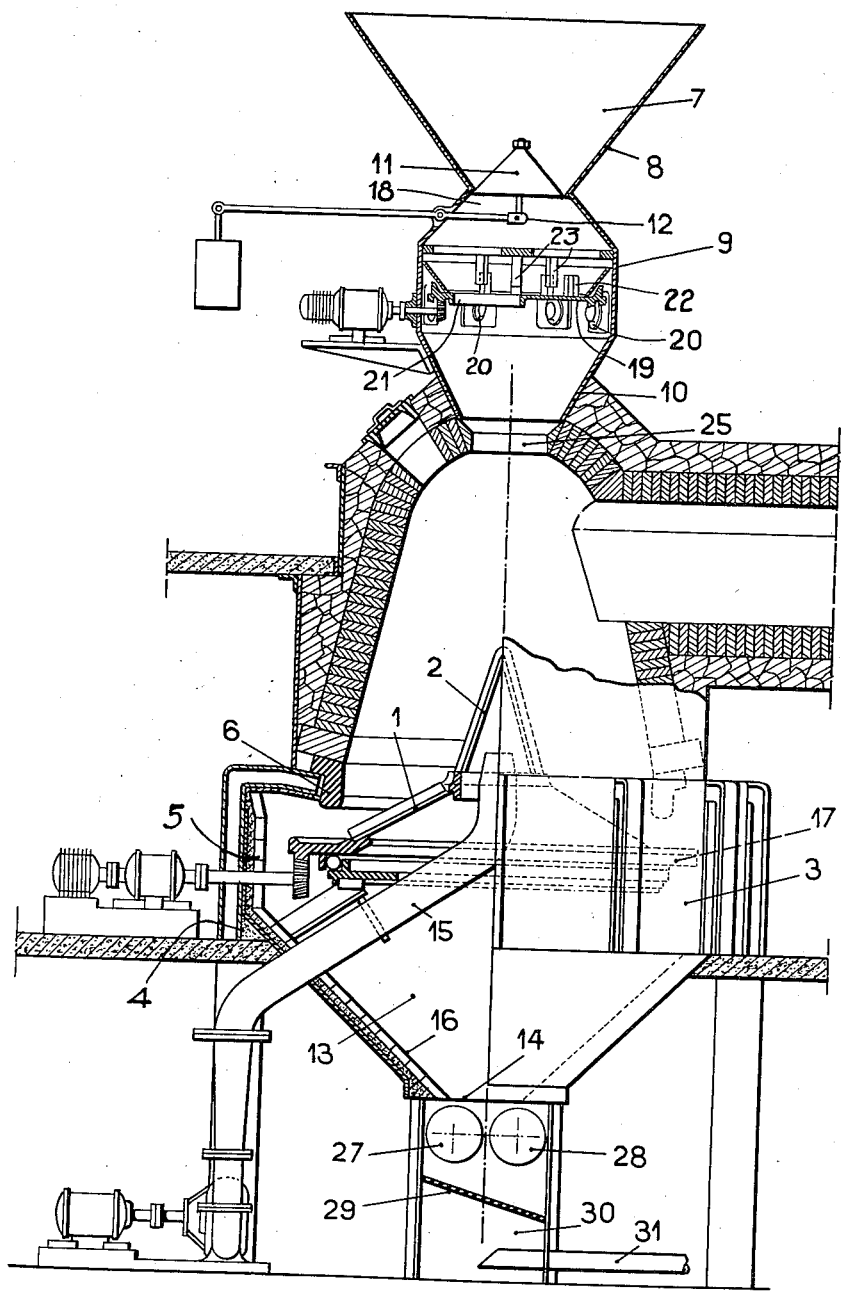
Inventor:-
Pierre Lorton
by E. F. [signature]
Atty.

Patented Feb. 2, 1937

2,069,584

UNITED STATES PATENT OFFICE 2,069,584

FURNACE FOR THE INCINERATION OF HOUSEHOLD REFUSE

Pierre Lorton, Paris, France

Application January 26, 1933, Serial No. 653,737
In France January 29, 1932

5 Claims. (Cl. 110—13)

The object of the present invention is a certain number of improvements in rotary hearth furnaces with a view to making said furnaces suitable for the incineration of household refuse, a further object of said improvements being to make it possible to keep said furnaces in continuous operation whereas the present furnaces for the incineration of household refuse only operate intermittently.

Further these improvements procure, for the furnaces to which they are applied, a greater resistance against the effects of the heat to which they are subjected.

These improvements bear:

1. On the feeding of the substances which, according to the invention, is effected in the center of the furnace, said substances being made to drop onto a trimming cone;

2. On a device for the regular distribution of the substances on the rotating hearth by means of which the feed hopper does not tip the substances directly into the furnace but does so onto a distributor (a rotating plate distributor for instance) which causes the substances to drop evenly over the whole of the outer circumference of the hearth;

3. On the construction of the trimming cone made in one piece with thin walls and provided with small blades intended to stir the substances, the cold air draught pipe opening out inside said cone;

4. On the providing of a crown, made of a fireproof substance, on a level with the fire-box and at the base of the tank, the outline of which is designed in such a manner as to gradually decrease the surface of flow of the burnt substances and to retain said substances until combustion is complete;

5. On the arrangement of the feed and clinkering hoppers the axis of which is positioned according to the vertical line passing through the center of the hearth;

6. On the provision of openings round the feed hopper for the manipulation of the substances in course of combustion;

7. On the constitution, in alignment with the fire-box and the ash-pit of a strengthening frame supporting the furnace body and made up of steel or reinforced concrete standards placed outside the walls in order that they may not be subjected to the action of the heat of the furnace; the wall which is thus placed inside of the strengthening parts is composed of sheet metal or of a thin filling of reinforced concrete; it is lined with fireproof substance;

8. On the pre-heating of the injected air by the clinker which remains at the bottom of the clinkering hopper, in order to keep the ash-pit air at a given temperature (250° to 300° C.), the metallic parts of the rotating hearth being preserved from contact with the clinker and cooled by the air injection owing to the shape of the ash-hopper, thus ensuring their preservation;

9. On the provision of a crushing device positioned beneath the clinkering hopper and intended for the purpose of crushing the clinker;

10. On the provision of a screen positioned below the crushing device mentioned in 9; said screen being intended for the purpose of arresting any metallic substances which may be contained in the clinker and which may comprise a magnetic separation device or not;

11. On the providing of a pneumatic conveyor starting from under the screen referred to in 10 the purpose of which is to remove the crushed ashes to the storage or sorting installations.

The attached drawing shows, as an instance, how a furnace constructed according to the invention may be set up.

Attempts have already been made, but without success, to employ rotary hearth furnaces as incineration furnaces for household refuse. Such furnaces were fed from the side and the substances fell on the periphery of the bars thus making it necessary (in order to insure even distribution of the substances) to keep the hearth in rotation while the furnace was being fed. As it is this rotation which regulates the evacuation of the slag the result was an interdependence between the feeding and the evacuation of the slag which caused the functioning of the furnace to be very irregular on account of the very heterogeneous composition of the substances incinerated.

The furnace which forms the subject matter of the present invention obviates this disadvantage by means of the central feed which can be effected without the hearth being in rotation thus affording the fullest freedom for the regulation of the rotation of the hearth according to the rate of combustion and the necessity of evacuating the slag. Continuous operation of the furnace and automatic evacuation of the slag are thus ensured.

On the other hand furnaces of the types at present in use have the disadvantage of placing the essential components as well as the reinforcement members of the furnace in comtact with the fire. The furnace which forms the subject matter of the present invention remedies this disadvantage in two ways:

(a) By making the reinforcing framework of the furnace of metallic or reinforced-concrete uprights which are positioned outside the furnace walls thus ensuring practically unlimited life;

(b) By suppressing all metallic parts at the base of the container, in line with the fire-box, and by making the bottom of the oven of a special part composed of fireproof material the outline of which is designed in such a manner as to provide a passage of progressively reduced section for the substances in course of combustion and for the clinker, thus ensuring a good combustion as well as automatic removal of the clinker and good preservation of the furnace.

The hearths of furnaces which are capable of being made suitable for the incineration of household refuse are generally composed of two metallic cones 1 and 2, having dissimilar summit angles, on which the substances it is desired to burn are placed. Up to the present the upper cone, into which the injected air arrives, was made of thick cast iron sections assembled by means of bolts. It was noticed however that a cone, constructed in this manner, deteriorated very rapidly and that, in addition, the various sections, being subject to dissimilar degrees of expansion, caused openings to be formed through which the injected air passed direct in the form of jets instead of passing under the fire-bars.

One of the improvements which constitute the invention consists in making cone 2 from thin metal and in one single piece as said cone is not submitted to any mechanical efforts; the petitioner has, in fact, noticed that cones 2 made of thin metal resisted in a perfect manner against the destructive action of the substances under treatment and of fire.

In the furnaces of the type at present in use ash-tray 3 positioned at the bottom of the combustion container was usually constituted of sheet metal enclosing the reinforcing parts forming the frame; by reason of its nature this part of the furnace was subject to distorsion likely to result in dislocation and corrosion was very rapid; according to the invention the carcase of the ash tray is made up of metallic parts or of reinforced concrete positioned outside the wall which forms the base of the container and of the ash-tray. Said wall is itself constituted by sheet metal or a filling 4 made of reinforced concrete; a lining 5 made with fire-proof material is positioned inside against the wall.

According to the invention, between the combustion container and the base of the furnace, a crown 6 made up of fireproof components suitably shaped in order to narrow down the evacuation section and ensure complete combustion, has been provided. This arrangement does away with the metallic crown usually applied in rotating hearth furnaces of the types at present known; the fire-proof crown resists perfectly against the destructive effects of the fire, a result it was not possible to obtain with the metallic crowns.

The raw material for the furnace is fed by a hopper 7 positioned at the upper part of the apparatus and according to its axis. This hopper comprises a prismatic or conical portion 8 which is followed by a cylindrical-conical part 9 terminating at the bottom in a conical portion 10.

Portion 8 of the hopper is closed, at its lower part, by a mitre plug 11, the downward movement of said plug which determines the opening of the passage is procured by actuating operating rod 12.

When mitre-plug 11 is open the material drops into distributor 18 which may be of any suitable model, that shown on the drawing being given merely as an example.

In the form of embodiment shown the distributor comprises a plate 19 rotating on an annular bearing 20 and rotationally driven by any suitable means, plate 19 is provided with an opening 21 and, on its upper surface with teeth 22 which, when said plate is rotating move between other teeth 23 solid with casing 9 in which the distributor assembly is housed.

The rotation of plate 19 determines a slow angular displacement of opening 21 through which the substances stirred by the combined system of teeth 22 and 23 drop through passage 25 onto the hearth of the furnace. The distribution of the substances over the whole surface of the rotating hearth is thus insured owing to the angular displacement of opening 21.

The material which drops from the hearth collects in the emptying hopper 13 which is positioned according to the general axis of the furnace and which is provided, at the bottom, with an opening 14. The walls of this hopper are constituted by an outer revetment of sheet metal or reinforced concrete and they are coated inside with a fire-proof lining 16.

The sealing of opening 14 is obtained by means of two crusher cylinders 27 and 28 rotating at low speed and between which the clinker is crushed.

The clinker which is in a state of ignition can be allowed to remain for a certain length of time at the base of container 13 thus heating up the air injected through tubing 15 to a temperature comprised between 250° and 300° C.

After having been crushed the ashes drop onto an inclined screen 29 which arrests, on its upper surface, those metallic portions contained in said ashes the size of which has remained greater than the spaces between the bars of the screen.

Moreover a magnetic separator may be combined with screen 29 in order to arrest the metallic elements which drop onto it with greater certainty.

The non-metallic substances pass through the screen and drop to the lower portion of box 30 whence they are removed, either continuously or not, and are conveyed to apparatus intended to treat them in a special manner, to storage bins or to any other location previously selected; the removal of said ashes is by means of suction pipes 31 since pneumatic handling is possible owing to the fact that the clinker being crushed while hot it is in a sufficiently perfect pulverous state to permit of this system of handling.

In a furnace constructed in the manner indicated above the feeding of the substances to be incinerated and the removal of the clinker can be effected at varying intervals according to the nature of the refuse under treatment; basis 17 of the hearth is capable of angular displacement and it is caused to rotate, from time to time, by any suitable means in order to cause the removal of the clinker by making the ashes drop from the base of said hearth.

Continuous operation of the furnace is thus obtained and this had not been previously attained, all furnaces for the incineration of household refuse working intermittently on account of the necessity of suspending operation for the purpose of removing the resulting clinker from the hearth.

What is claimed is:

1. A household refuse-incinerator comprising in combination, a hopper for feeding the substances to be incinerated, a distributor positioned below said hopper and above the center of the combustion chamber, a rotatable hearth, said distributor including means for distributing said substances over the upper surface of said hearth, said hearth having a central agitating cone made of one single piece of thin metal and provided with stirring blades, means for introducing air within said cone, means for causing said hearth to rotate, a receiving hopper below said hearth having downwardly converging side walls for evacuating the clinker, rotatable crushing rollers at the bottom of said receiving hopper, a screen below said rollers for arresting the passage of metallic substances and suction means below said screen for evacuating the pulverized clinker.

2. In a household refuse incinerator according to claim 1, wherein said feeding hopper gradually decreases in cross section downwardly.

3. In a household refuse incinerator according to claim 1, wherein means are provided utilizing the clinker heat effect upon said means for introducing air for heating the air blown into the central agitating cone.

4. In a household refuse incinerator according to claim 1 wherein the feeding and receiving hoppers are positioned so that the axes thereof coincide with a vertical line drawn through the center of the hearth.

5. In a household refuse incinerator according to claim 1 wherein there is provided in alignment with the fire-box and the ash-pit, a reinforcing framework positioned outside the furnace walls.

PIERRE LORTON.